US011630673B2

(12) United States Patent
Grant

(10) Patent No.: US 11,630,673 B2
(45) Date of Patent: Apr. 18, 2023

(54) SYSTEM AND METHOD FOR PHYSICALLY SEPARATING, ACROSS DIFFERENT PROCESSING UNITS, SOFTWARE FOR HANDLING EXCEPTION CAUSING EVENTS FROM EXECUTING PROGRAM CODE

(71) Applicant: Arm Limited, Cambridge (GB)

(72) Inventor: Alasdair Grant, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/269,938

(22) PCT Filed: Oct. 16, 2019

(86) PCT No.: PCT/GB2019/052943
§ 371 (c)(1),
(2) Date: Feb. 19, 2021

(87) PCT Pub. No.: WO2020/115455
PCT Pub. Date: Jun. 11, 2020

(65) Prior Publication Data
US 2021/0240480 A1 Aug. 5, 2021

(30) Foreign Application Priority Data
Dec. 6, 2018 (GB) ...................................... 1819930

(51) Int. Cl.
*G06F 9/38* (2018.01)
(52) U.S. Cl.
CPC .......... *G06F 9/3861* (2013.01); *G06F 9/3881* (2013.01)
(58) Field of Classification Search
CPC .... G06F 9/3861; G06F 9/3877; G06F 9/3879; G06F 9/3881; G06F 9/00–3897
See application file for complete search history.

(56) References Cited

U.S. PATENT DOCUMENTS

| 5,463,778 A | * | 10/1995 | Johnson | ................ | G06F 9/3861 712/229 |
| 5,909,565 A | * | 6/1999 | Morikawa | ............. | G06F 9/3877 712/200 |

(Continued)

FOREIGN PATENT DOCUMENTS

| JP | 2010-15364 | 1/2010 |
| WO | 00/70482 | 11/2000 |

OTHER PUBLICATIONS

"Address space", Wikipedia, Sep. 18, 2018, 3 pages.

(Continued)

*Primary Examiner* — Keith E Vicary
(74) *Attorney, Agent, or Firm* — Nixon & Vanderhye P.C.

(57) ABSTRACT

A first processor for executing program code has a control interface mapped to the memory address space of a second processor and provides the second processor with direct mapped access to state information of the first processor. The first processor responds to an exception causing event to enter a halted mode stopping execution of the program code and issuing a trigger event. The second processor responds to the trigger to execute an exception handling routine during which the second processor accesses and modifies the state information via the control interface as required by the exception handling routine. On completion of the exception handling routine, the second processor causes the first processor to exit the halted mode and resume execution of the program code. Thus, the program code is physically separated from the software used to perform the exception handling routine to improve security.

22 Claims, 8 Drawing Sheets

(56) References Cited

U.S. PATENT DOCUMENTS

| | | | | |
|---|---|---|---|---|
| 6,003,129 A * | 12/1999 | Song | ................. | G06F 15/17 |
| | | | | 712/28 |
| 6,341,324 B1 * | 1/2002 | Caulk, Jr. | ............. | G06F 9/3885 |
| | | | | 712/E9.055 |
| 6,480,948 B1 * | 11/2002 | Virajpet | .............. | G06F 12/0638 |
| | | | | 711/E12.083 |
| 6,591,378 B1 | 7/2003 | Arends et al. | | |
| 7,546,441 B1 * | 6/2009 | Ansari | ................. | G06F 9/3869 |
| | | | | 712/225 |
| 2006/0174246 A1 * | 8/2006 | Tamura | ................. | G06F 9/485 |
| | | | | 718/100 |
| 2007/0168646 A1 * | 7/2007 | Collard | .................. | G06F 15/16 |
| | | | | 712/34 |
| 2007/0174555 A1 * | 7/2007 | Burtscher | ............. | G06F 9/3851 |
| | | | | 712/E9.05 |
| 2013/0007751 A1 * | 1/2013 | Farrell | .................... | G06F 9/544 |
| | | | | 718/102 |
| 2013/0167149 A1 * | 6/2013 | Mitsugi | .................. | G06F 9/455 |
| | | | | 718/1 |
| 2013/0205125 A1 * | 8/2013 | Grocutt | .................. | G06F 9/461 |
| | | | | 712/244 |
| 2014/0089635 A1 * | 3/2014 | Shifer | ................. | G06F 9/30076 |
| | | | | 712/30 |
| 2016/0140064 A1 * | 5/2016 | Chin | ......................... | G06F 1/08 |
| | | | | 710/119 |
| 2017/0315816 A1 * | 11/2017 | Smith | .................... | G06F 9/4812 |
| 2018/0031632 A1 | 2/2018 | Blankenburg et al. | | |
| 2018/0113811 A1 * | 4/2018 | Xing | ....................... | G06F 12/08 |
| 2018/0239607 A1 * | 8/2018 | Parker | ................... | G06F 9/3861 |

OTHER PUBLICATIONS

Search Report for GB Application No. 1819930.7 dated Jun. 4, 2019, 4 pages.

International Search Report and Written Opinion of the ISA for PCT/GB2019/052943 dated Jan. 22, 2020, 19 pages.

* cited by examiner

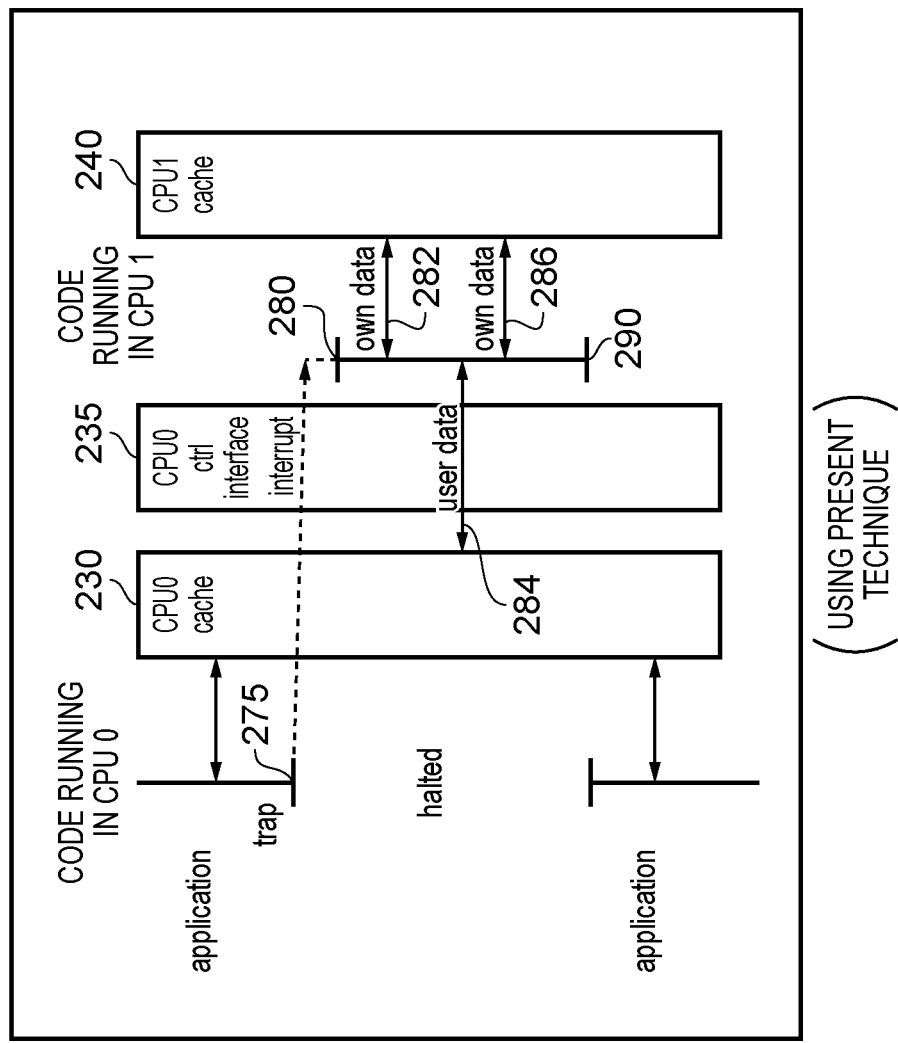
FIG. 4B (USING PRESENT TECHNIQUE)
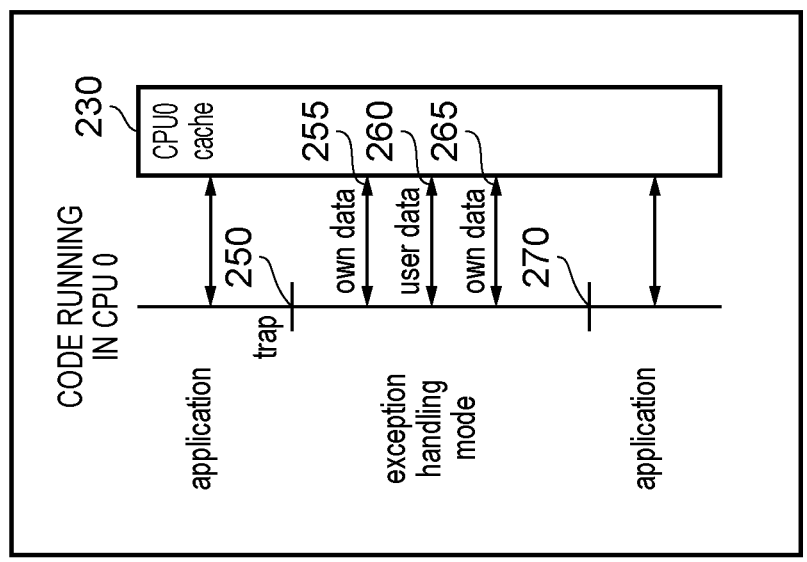
FIG. 4A (WITHOUT PRESENT TECHNIQUE)

SYSTEM AND METHOD FOR PHYSICALLY SEPARATING, ACROSS DIFFERENT PROCESSING UNITS, SOFTWARE FOR HANDLING EXCEPTION CAUSING EVENTS FROM EXECUTING PROGRAM CODE

This application is the U.S. national phase of International Application No. PCT/GB2019/052943 filed Oct. 16, 2019 which designated the U.S. and claims priority to GB Patent Application No. 1819930.7 filed Dec. 6, 2018, the entire contents of each of which are hereby incorporated by reference.

BACKGROUND

The present technique relates to an apparatus and method for handling exception causing events.

When executing software on a processing unit, events may arise causing an exception to be raised. At that point, execution of an interrupt service routine may be invoked in order to handle the exception causing event. Often, the interrupt service routine may be executed at a higher level of software execution privilege, and be part of code that is more trusted than the code whose execution gave rise to the exception causing event. In some example implementations, the level of software execution privilege may be referred to as an exception level, and accordingly when an exception causing event occurs during the execution of a particular piece of software, it may be the case that there is a transition to a higher exception level, in order to then execute the interrupt service routine at that higher exception level.

In such systems, it is desirable to increase the level of security within the system, in order to mitigate the risks of less trusted code gaining access to the data associated with more trusted code.

SUMMARY

In one example configuration, there is provided a system comprising: a first processing unit to execute program code; and a second processing unit; the first processing unit having a control interface mapped to memory address space of the second processing unit and configured to provide the second processing unit with direct mapped access to state information of the first processing unit; the first processing unit being responsive to at least one exception causing event to enter a halted mode where the first processing unit stops execution of the program code and issues a trigger event; the second processing unit being responsive to the trigger event to execute an exception handling routine during which the second processing unit is arranged to access the state information of the first processing unit via the control interface in order to modify the state information as required by the exception handling routine; the second processing unit being arranged on completion of the exception handling routine to cause the first processing unit to exit the halted mode and resume execution of the program code.

In another example configuration, there is provided a first processing unit comprising: execution circuitry to execute program code; and a control interface mapped to memory address space of a second processing unit and configured to provide the second processing unit with direct mapped access to state information of the first processing unit; the first processing unit being responsive to at least one exception causing event to enter a halted mode where the execution circuitry stops execution of the program code, and a trigger event is issued; the control interface being arranged to be accessible to the second processing unit whilst the second processing unit is executing an exception handling routine in response to the trigger event, to enable the second processing unit to access and modify the state information of the first processing unit as required by the exception handling routine; the first processing unit being arranged, when the second processing unit has completed the exception handling routine, to exit the halted mode and resume execution of the program code.

In a yet further example configuration, there is provided a second processing unit comprising: execution circuitry to execute an exception handling routine in response to a trigger event issued by a first processing unit, the trigger event indicating that the first processing unit has entered a halted mode where execution of program code by the first processing unit has been halted; and a communication interface via which the second processing circuitry is arranged to access a control interface of the first processing unit whilst executing the exception handling routine, the control interface being mapped to memory address space of the second processing unit and configured to provide the second processing unit with direct mapped access to state information of the first processing unit; the second processing unit being arranged to access the state information of the first processing unit via the control interface in order to modify the state information as required by the exception handling routine; and the second processing unit being arranged on completion of the exception handling routine to cause the first processing unit to exit the halted mode and resume execution of the program code.

In a still further example configuration, there is provided a method of handling exception causing events in a system having a first processing unit to execute program code, and a second processing unit, comprising: providing the first processing unit with a control interface mapped to memory address space of the second processing unit and configured to provide the second processing unit with direct mapped access to state information of the first processing unit; responsive to at least one exception causing event within the first processing unit, causing the first processing unit to enter a halted mode where the first processing unit stops execution of the program code, and issues a trigger event; causing the second processing unit to be responsive to the trigger event to execute an exception handling routine during which the second processing unit accesses the state information of the first processing unit via the control interface in order to modify the state information as required by the exception handling routine; and on completion of the exception handling routine by the second processing unit, causing the first processing unit to exit the halted mode and resume execution of the program code.

In another example configuration, there is provided a system comprising: a first processing means for executing program code; and a second processing means; the first processing means having a control interface means mapped to memory address space of the second processing means for providing the second processing means with direct mapped access to state information of the first processing means; the first processing means for responding to at least one exception causing event by entering a halted mode where the first processing means stops execution of the program code and by issuing a trigger event; the second processing means, responsive to the trigger event, for executing an exception handling routine during which the second processing means is arranged to access the state information of the first processing means via the control interface means in order to modify the state information as required by the exception handling routine; the second processing means, on completion of the exception handling routine, for causing the first processing means to exit the halted mode and resume execution of the program code.

BRIEF DESCRIPTION OF THE DRAWINGS

The present technique will be described further, by way of illustration only, with reference to examples thereof as illustrated in the accompanying drawings, in which:

FIG. 4A illustrates the handling of exceptions without using the present technique, whilst FIG. 4B illustrates the handling of exceptions when using the present technique;

DESCRIPTION OF EXAMPLES

Figure 1:
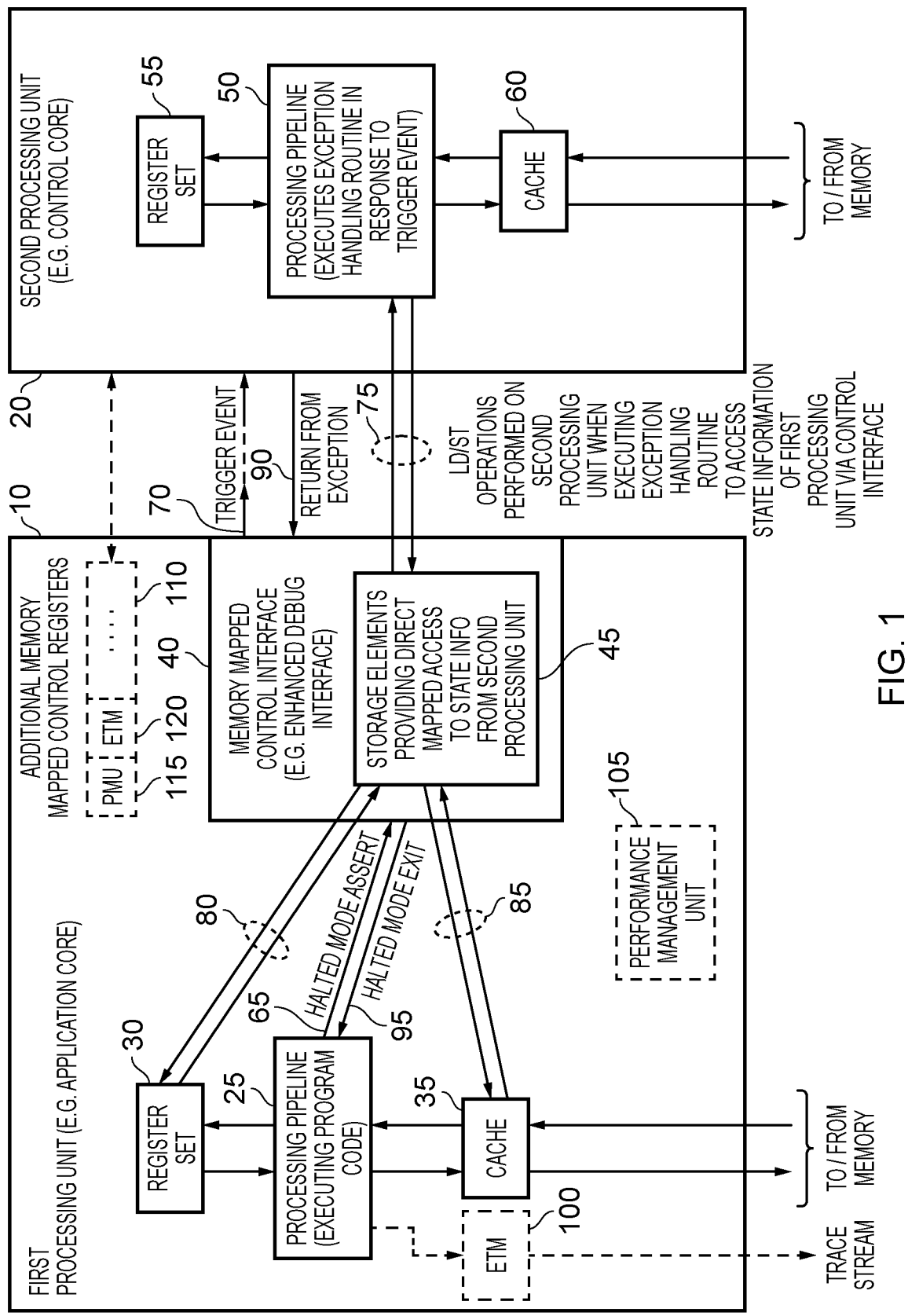
FIG. 1 is a block diagram illustrating components provided within a system in accordance with one example implementation.

In one example configuration a system may provide a first processing unit for executing program code, and a second processing unit. The second processing unit may also execute program code, but of interest to techniques described herein is how the second processing unit is used in situations where an exception causing event occurs during the execution of program code by the first processing unit.

The first processing unit is provided with a control interface that is mapped to the memory address space of the second processing unit, and configured to provide the second processing unit with direct mapped access to state information of the first processing unit. Hence, via the control interface, the second processing unit is provided with direct mapped access to at least some of the state of the first processing unit.

The first processing unit is arranged such that it is responsive to at least one exception causing event to enter a halted mode where the first processing unit stops execution of the program code, and issues a trigger event. The second processing unit is then arranged such that it is responsive to such a trigger event to execute an exception handling routine during which the second processing unit may access the state information of the first processing unit via the control interface, in order to modify the state information as required by the exception handling routine. Hence, in contrast to the normal approach where the first processing unit itself would execute the required exception handling routine, having first transitioned to a higher level of software execution privilege if required, in accordance with the technique described herein the first processing unit does not execute the exception handling routine, and instead the exception handling routine is executed by a separate processing unit. This hence enables a physical separation to be achieved between the first processing unit executing its program code, and a separate processing unit used to perform an exception handling routine on behalf of the first processing unit. This can significantly increase security within the system.

On completion of the exception handling routine, the second processing unit may then be arranged to cause the first processing unit to exit the halted mode and resume execution of the program code. Since the second processing unit has access to the required state information via the control interface of the first processing unit, it can efficiently manipulate the state of the first processing unit as required whilst performing the exception handling routine on behalf of the first processing unit, such that when in due course the first processing unit exits the halted mode, it can correctly resume execution of the program code with the state having been updated as appropriate in order to handle the exception causing event.

Thus, by providing a first processing unit with a control interface that is mapped into the memory address space of the second processing unit, and allowing the second processing unit to have direct mapped access to the relevant state information of the first processing unit, the performance of the exception handling routine required to deal with an exception caused by an exception causing event can be offloaded from the first processing unit to a physically separate processing unit, thereby significantly mitigating against the possibility of certain types of attack that may seek to obtain access to trusted data from untrusted code.

The state information that the second processing unit is given direct mapped access to via the control interface of the first processing unit may take a variety of forms. In one example implementation, such state information comprises content of a set of registers of the first processing unit used to store data processed by the first processing unit when executing the program code. Hence, during performance of the execution handling routine on the second processing unit, the second processing unit can read the content of those registers, and update the content of those registers as required, in an efficient manner using the control interface of the first processing unit.

There are a number of ways in which the control interface can be arranged to provide the second processing unit with direct mapped access to the above-mentioned set of registers of the first processing unit. In one example arrangement, the control interface provides a set of storage elements mapped to the memory address space of the second processing unit to provide direct mapped access to the set of registers by the second processing unit. Hence, each storage element within the set can be addressed by the second processing unit, and is directly mapped to a corresponding register within the set of registers of the first processing unit. As a result, whenever the second processing unit makes a read or write access to one of those storage elements, that is used to trigger a corresponding read or write access to the associated register within the set of registers of the first processing unit.

In addition to, or instead of, access to the set of registers of the first processing unit, the second processing unit may be given direct mapped access to at least a portion of the memory address space of the first processing unit, and hence at least a part of the state information of the first processing unit made available to the second processing unit via the control interface can be a portion of the memory address space of the first processing unit.

In one example arrangement, such a portion of the memory address space of the first processing unit may be arranged to form a secondary address space of the second processing unit that is separate to the second processing unit's primary address space. There are a number of mechanisms that could be provided to allow the second processing unit to access that secondary address space. For example, separate load/store instructions could be used for this purpose, or tag bits could be added to a non-address portion of an address register used by the second processing unit when generating memory addresses, to influence whether it generates memory accesses within the primary address space or the secondary address space.

However, the provision of a secondary address space as identified above is likely to require certain architectural changes to the system. In an alternative implementation, such architectural changes may be avoided by mapping the relevant portion of the memory address space of the first processing unit into the primary address space of the second processing unit. For example, the control interface may provide a block of storage elements mapped to the memory address space of the second processing unit, each storage element in the block being directly mapped to a corresponding memory location within the at least a portion of the memory address space of the first processing unit. Hence, in such instances the relevant memory address space of the first processing unit can be accessed by the second processing unit in much the same way as the earlier-mentioned set of registers of the first processing unit can be accessed.

To allow configurability as to how the block of storage elements within the control interface are associated with the various memory locations of the portion of the memory address space of the first processing unit, the control interface may comprise configurable mapping storage to identify the direct mapping between the storage elements in the block of storage elements and the corresponding memory locations within the at least a portion of the memory address space of the first processing unit.

In one example implementation, any exception causing event arising whilst the first processing unit is executing the program code may be handled in the above-discussed manner, i.e. causing the first processing unit to enter the halted mode and issue a trigger event. However, in other implementations this may be constrained to only occur for certain exception causing events, whilst other exception causing events may be handled in the traditional manner, i.e. within the first processing unit itself, possibly in association with a transition in the exception level of the first processing unit prior to performing the exception handling routine.

In one implementation, the control interface may further comprise configurable exception event identifying storage to identify which exception causing events, when encountered during execution of the program code by the first processing unit, are to cause the first processing unit to enter the halted mode and issue the trigger event. Hence, the first processing unit can be controlled by the contents of the configurable exception event identifying storage so that, on detecting an exception causing event it can determine whether it is appropriate to enter the halted mode and issue the trigger event.

Such an approach provides a great deal of flexibility in the use of the above-described technique. As a specific example use case the exception event identifying storage may be configured to identify that the first processing unit is to enter the halted mode and issue the trigger event whenever an exception causing event occurs which would require the first processing unit transitioning to a specified exception level were the exception causing event to be handled by the first processing unit. Hence, in situations where the handling of the exception causing event within the first processing unit would not cause it to transition to the specified exception level, it may be determined to allow the required exception handling routine to be performed by the first processing unit itself, but in situations where it would be necessary for the first processing unit to transition to the specified exception level (or alternatively to the specified exception level or a higher exception level), then instead of taking that step the first processing unit can be arranged to enter the halted mode and issue the trigger event, hence causing the required exception handling routine to be performed by the physically separate second processing unit.

In one example implementation, the first processing unit is arranged to remain at its current exception level when entering the halted mode, and the second processing unit is arranged to execute the exception handling routine at a chosen exception level. Hence, through use of the above-described techniques, the exception causing event is handled without the first processing unit needing to change its current exception level. Instead the first processing unit merely enters the halted mode, remaining at its current exception level, and when in due course it is instructed to exit the halted mode, it can then resume execution of the program code at that current exception level. This avoids the need for the first processing unit to take steps that might otherwise be required were the first processing unit to transition to a different exception level in order to handle the exception handling routine. Such steps could for example involve saving the current execution state and the return address, entering the required mode/exception level, potentially flushing certain data from temporary storage such as a local cache, etc. Hence, in addition to the security benefits that can be realised by adopting the techniques described herein, certain efficiency benefits can also be realised in some implementations.

The chosen exception level at which the second processing unit executes the exception handling routine can take a variety of forms. For instance, it could be in some instances that the chosen exception level of the second processing unit is the same as the current exception level of the first processing unit. However, in one particular implementation, the chosen exception level is an exception level higher than the current exception level of the first processing unit.

In one implementation, the trigger event may incorporate certain information to assist the second processing unit in identifying why the first processing unit entered the halted mode. However, as an alternative to supplementing the trigger event itself, in one implementation the control interface may comprise syndrome storage mapped to the memory address space of the second processing unit and written to by the first processing unit to provide information used by the second processing unit to assist in identifying why the first processing unit entered the halted mode. Hence, when the second processing unit handles the trigger event, it can then perform read accesses to the syndrome storage to obtain information to assist in identifying why the first processing unit entered the halted mode, thereby improving the efficiency of the process required in order to handle the exception causing event.

There is no need for there to be a one-to-one mapping between the first processing unit and the second processing unit. For example, the second processing unit could perform the above-described functionality on behalf of a variety of different processing units that are executing program code. For instance, in one example arrangement the system may further comprise a third processing unit having a further control interface mapped to memory address space of the second processing unit and configured to provide the second processing unit with direct mapped access to state information of the third processing unit. The third processing unit may be responsive to at least one exception causing event to enter the halted mode where the third processing unit stops execution and issues the trigger event. The trigger event may comprise information enabling the second processing unit to determine whether the trigger event was issued by the first processing unit or the third processing unit, and thus determine which of the first and third processing units to access when executing the exception handling routine. Hence, in this instance the second processing unit can perform exception handling routines on behalf of both the first processing unit and the third processing unit, and can access the required state information of either processing unit as required via the associated control interface that is mapped into its memory address space.

In one example implementation, the handling of exceptions can be nested at multiple levels within the system. Hence, whilst the second processing unit may handle exceptions on behalf of the first processing unit, it itself may be arranged so that exception causing events occurring whilst it is executing code can be handled by an additional processing unit. Hence, in one example arrangement the system may further comprise an additional processing unit, with the second processing unit having a second control interface mapped to memory address space of the additional processing unit and configured to provide the additional processing unit with direct mapped access to state information of the second processing unit. The second processing unit may then be responsive to at least one exception causing event arising during execution of program code on the second processing unit, to enter the halted mode where the second processing unit stops execution of the program code being run on the second processing unit, and issues a further trigger event. The additional processing unit is then responsive to the further trigger event to execute a further exception handling routine during which the additional processing unit is arranged to access the state information of the second processing unit via the second control interface in order to modify that state information as required by the further exception handling routine. The additional processing unit is then arranged on completion of the further exception handling routine to cause the second processing unit to exit the halted mode and resume execution of the program code being run on the second processing unit.

By such an approach, it will be appreciated that any arbitrary level of nesting can be achieved if desired. With such an implementation, each individual processing unit may be configured so that it can only operate at a subset of the available exception levels within the system. Indeed, at one extreme, all individual processing units could be arranged to only execute at a single exception level, with any exception causing events that would have caused a transition to a higher exception level were they to be handled by the current processing unit, instead being handled by the current processing unit entering the halted mode and issuing the trigger event, with that trigger event then being processed by another processing unit operating at that higher exception level.

The various processing units within the system can take a variety of forms. In one example arrangement the first processing unit is an application processing unit and the program code is application program code, and the second processing unit is a control processing unit. Hence, in one example arrangement, the first processing unit can be arranged so that it only executes application code, and may be configured so that it can only operate at the lowest level of software execution privilege, for instance at the lowest exception level. Any exception causing events that would require execution of code at a higher exception level are not handled by the first processing unit, and instead are off-loaded to another processing unit via the techniques described herein.

In one example arrangement, the first processing unit and the second processing unit may be provided by separate processor cores. In one such arrangement, the first processing unit and the second processing unit may have separate cache structures for at least a subset of the cache levels within the system. By suitable separation of the cache structures between the first processing unit and the second processing unit, this can further improve the security benefits, for example in relation to recently publicised speculation-based cache timing side-channel attacks, where a number of techniques can be used to seek to produce scenarios where cache timing analysis can then be abused to leak information out of mis-speculated execution of instructions. By ensuring that separate cache structures are used, at least at the higher levels of cache such as the level one and the level two caches, such attacks can be mitigated against.

There is no requirement for the first processing unit and the second processing unit to be separate processor cores. For example, in another implementation the first processing unit and the second processing unit may be provided by separate threads on a multi-threaded processor core. Each thread has its own architectural state, and hence the techniques described herein can be applied in relation to such separate threads within a multi-threaded processor core.

As mentioned earlier, the techniques described herein can provide a great degree of flexibility in how a system is configured. For example, at least one of the first processing unit and the second processing unit may be constrained to only operate at a single exception level. Indeed, as mentioned earlier, by appropriate nesting techniques it may be possible that each individual processing unit is constrained to only operate at a single exception level.

The trigger event issued by the first processing unit can take a variety of forms. For example, it may explicitly target a particular processing unit that is to handle that trigger event, and hence in such instances the second processing unit is a targeted processing unit to which the trigger event is issued. However, in an alternative approach, the trigger event could be issued to some distribution mechanism that decides which processing unit is to then handle that trigger event, in which case the second processing unit is a processing unit amongst several processing units that is capable of responding to the trigger event.

Particular examples will now be described with reference to the Figures.

FIG. 1 is a block diagram of a system in accordance with one example implementation. A first processing unit 10 is provided that has a processing pipeline 25 for executing program code. During the execution of instructions by the processing pipeline, the processing pipeline will access registers of a register set 30 in the standard manner, in order to obtain source operands for the instructions, and to store result operands produced by execution of those instructions to the register set. Data can be loaded from memory into the registers via load operations, and similarly data may be stored back out to memory via execution of store instructions. The memory system may include one or more levels of cache, such as the cache 35 shown in FIG. 1.

As is well understood by those of ordinary skill in the art, during the execution of program code within a processing unit, situations may arise that give rise to an exception being taken, such situations being referred to herein as exception causing events. Such exception causing events can take a wide variety of different forms, for example input/output (I/O) device requests, requests to invoke an operating system service from a user program (often referred to as a system call), integer arithmetic overflow or underflow, a page fault, etc.

It is also known for a processing unit to be able to execute at a number of different levels of software execution privilege, referred to herein as different exception levels. When an exception causing event causes an exception to be taken, this will typically require the execution of an interrupt service routine (also referred to herein as an exception handling routine) in order to deal with the exception. Often, although not in all cases, it may be required for the processing unit to transition to a different, higher privilege, exception level, prior to executing the interrupt service routine in order to handle the exception.

In order to ensure security of data within the system, it is desirable to ensure that software executing at a particular exception level cannot access certain data associated with the software executing at a higher exception level. There are known mechanisms to seek to isolate the data used by trusted code within the system, so that it cannot be accessed by less trusted code running at a lower exception level. However, attackers are becoming ever more sophisticated with regard to techniques they employ to seek to gain access to trusted data when executing untrusted code. As a particular example, speculation-based cache timing side-channel attacks have been developed (often referred to as Spectre), where a number of techniques can be used so that cache timing analysis can then be abused to seek to leak information out of mis-speculated execution of instructions. Against this background, it would be desirable to increase the security within a system when handling exceptions, to ensure that trusted data manipulated at a higher exception level is not unwittingly made available to code executing at a lower, less trusted, exception level.

As will be discussed in more detail herein, the first processing unit 10 is arranged such that, for at least some of the types of exception causing events that may arise, the first processing unit does not handle the exception itself, for example by switching to a higher exception level and executing a suitable interrupt service routine on the processing pipeline 25, but instead a mechanism is provided that enables the servicing of that exception to be handled by a physically separate processing unit, referred to as the second processing unit 20 in FIG. 1.

In particular, the first processing unit 10 has a memory mapped control interface 40 which is mapped to the memory address space of the second processing unit 20. In particular, a number of storage elements 45 are provided within the memory mapped control interface 40 that are mapped to a portion of the memory address space of the second processing unit, allowing load and store instructions to be executed on the processing pipeline 50 in order to read and write to those storage elements 45, through the specifying of corresponding addresses within the second processing unit's memory address range.

Furthermore, those storage elements 45 are configured so as to provide direct mapped access to certain state information of the first processing unit. In particular, as will be discussed in more detail later with reference to FIG. 2, certain of those storage elements may provide direct mapped access to the registers within the register set 30, enabling a second processing unit to read and update the contents of those registers when performing an interrupt service routine to handle an exception raised by the first processing unit 10. Similarly, a certain portion of the memory address space of the first processing unit may be made available to the second processing unit via the storage elements 45 such that load or store operations performed in respect of those storage elements by the second processing unit 20 will cause data to be read from, or written to, memory locations within the memory address space of the first processing unit 10. Hence, via the storage elements 45, the second processing unit may be able to perform read and write operations to the register set 30, as indicated by the bi-directional lines 80 in FIG. 1, and similarly may be able to perform read and write operations with regards to at least a subset of the first processing unit's memory address space, as indicated by the bi-directional lines 85 interfacing with the cache 35 of the first processing unit 10.

The second processing unit may be arranged in a similar manner to the first processing unit, and hence can have a processing pipeline 50 arranged to execute instructions, during which the processing pipeline may access an associated set of registers 55, and may also load data into those registers from memory via its local cache 60, or store data from the registers back to memory via the local cache 60.

In accordance with the techniques described herein, for at least certain types of exception causing events, the processing pipeline 25 is arranged to enter the halted mode of operation where it ceases execution of program code, and issues a trigger event. In particular, the processing pipeline 25 can assert a halted mode signal over path 65 causing a trigger event 70 to be output from the first processing unit 10. The trigger event may be directed to a particular processing unit, or may be issued to an interrupt distributing entity which applies any suitable criteria to determine which processing unit to direct the trigger event to. In the current instance, it is assumed that the trigger event is ultimately propagated on to the second processing unit 20.

Upon receipt of the trigger event, the second processing unit interrupts the processing being performed within its processing pipeline 50, and based on the information provided in the trigger event determines a suitable interrupt service routine to be executed to handle the exception raised by the first processing unit 10.

When executing the interrupt service routine, the processing pipeline 50 may perform load and/or store operations via the paths 75, which are directed to memory addressable storage elements 45 within the memory mapped control interface 40. As discussed earlier, read or write accesses to the storage elements trigger corresponding accesses to direct mapped state holding structures within the first processing unit, for example registers of the register set 30 via the paths 80, or memory locations within the first processing unit's memory address space via the paths 85.

As a result, during the processing of the interrupt service routine, the second processing unit 20 is able to access required state within the first processing unit, and is able to modify that state as required by the interrupt service routine.

Whilst this process is being performed under the control of the second processing unit, the first processing unit remains within the halted mode, and accordingly it does not execute any instructions within the processing pipeline 25. When the exception handling routine is completed by the second processing unit, then a signal can be issued over path 90 to indicate that the exception handling process is complete, i.e. that there is a return from the exception. At this point, the first processing unit is free to resume execution of the program code, and accordingly a halted mode exit signal is transmitted over path 95 to the processing pipeline 25 to cause program execution to resume.

It should be noted that by such a mechanism, the processing pipeline 25 does not need to transition from its current exception level, i.e. from the exception level that it was operating in prior to the exception causing event arising. Instead, it can merely halt execution whilst remaining in the current exception level, and in due course can then resume execution of the program code, again whilst staying at the current exception level.

Through use of the memory mapped control interface 40, it is possible to offload the processing of the exception handling routine to a physically separate processing unit 20, by providing a mechanism for that physically separate processing unit to access and modify the state information of the first processing unit as required to enable it to effectively perform the exception handling routine. This provides significantly enhanced security within the system. For example, if the exception causing event were of a type that would normally require the first processing unit to enter a higher exception level prior to performing the exception handling routine, then there is no longer a requirement for that transition to take place within the first processing unit. Instead, the exception handling routine can be executed by the separate processing unit, which may or may not itself transition to a higher exception level in order to perform that exception handling routine, and the physical separation between the software operating at the different exception levels in this instance significantly enhances security.

If desired, the second processing unit can also be given memory mapped access to other storage within the first processing unit, for example the additional memory mapped control registers 110. For example, an embedded trace macrocell (ETM) 100 may be provided within the first processing unit to generate a trace stream indicative of the processing activities of the processing pipeline 25, with the operation of that ETM being controlled by certain control information 120 stored within the control registers 110. Similarly, a performance management unit (PMU) 105 may be provided to produce certain performance metrics indicative of the operating performance of the first processing unit, and that performance management unit may also be configured based on control information 115 within the control registers 110. If desired, the second processing unit 20 can be given memory mapped access to the control registers 110, to allow the second processing unit to program the operations to be performed by the ETM 100 and the PMU 105.

The memory mapped control interface 40 can in one implementation be provided by enhancing functionality provided within a debug interface of the first processing unit 110. In particular, when performing debugging operations on a first processing unit, a debug interface may provide mechanisms to enable the execution of the processing pipeline to be halted as and when required. Such a mechanism may be supplemented to allow a higher performance access from an external device, such as the second processing unit, rather than merely providing a standard external debug interface, and by providing direct mapped access to certain state information of the first processing unit, thus providing an efficient mechanism for an interrupt service routine executing on a separate processing unit 20 to access and update that state information during the handling of an exception.

Figure 2:
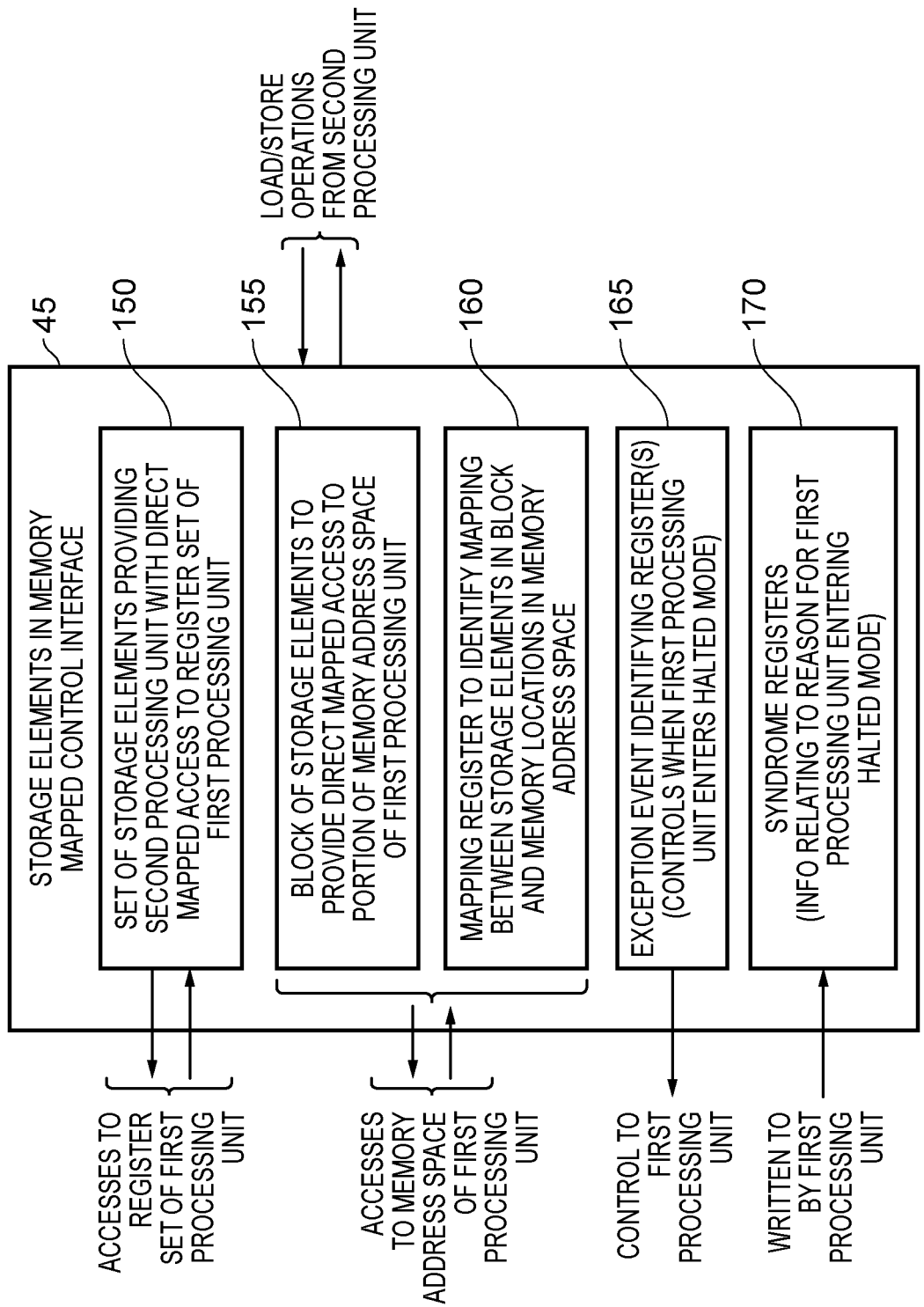
FIG. 2 is a diagram illustrating in more detail the storage elements which may be provided within the memory mapped control interface of FIG. 1 in accordance with one example implementation.

FIG. 2 is a diagram illustrating in more detail the storage elements 45 that may be provided within the memory mapped control interface 40 in one example implementation.

As shown, a set of storage elements 150 may be provided in order to give the second processing unit direct mapped access to the registers 30 of the first processing unit. For example, each individual storage element within the set may be directly mapped to one of the registers in the register set 30. When the processing pipeline 50 in the second processing unit 20 then performs a load or store operation, specifying a memory address that maps to a particular storage element within the set 150, this can be used in order to directly access the register within the register set. For example, when performing a load operation, the contents from the relevant register 30 can be retrieved into the storage element within the set 150 for provision back to the processing pipeline 50, and similarly when performing a store operation, data can be written into the addressed storage element within the set 150 to directly cause an update to be made into a corresponding register of the register set 30.

As also shown in FIG. 2, if desired a block of storage elements 155 can be provided to provide direct mapped access to a portion of the memory address space of the first processing unit. For example, the block of storage elements 155 can be associated with a particular range of addresses within the second processing unit's memory address space, to allow load and store operations to be performed by the second processing unit in respect of those block of storage elements. Further, each storage element can be directly mapped to an associated memory location within the first processing unit's memory address space, so that any access performed in respect of such a storage element is then directly performed in respect of the associated memory location.

The way in which the storage elements in the block 155 are mapped to particular memory locations within the first processing unit's memory address space may be configurable, and hence for example one or more mapping registers 160 may be provided to identify the mapping between the storage elements in the block 155 and corresponding memory locations in the memory address space of the first processing unit 10. The mapping register(s) may be written to in a variety of ways, for example by trusted code executed on the second processing unit 20, by suitable trusted code executed on the first processing unit 10, or by trusted code executed on a further processing unit used to set up the relationship between the first and second processing units. By such an approach, state information held within memory of the first processing unit 10 can be accessed and updated during execution of the interrupt service routine on the processing pipeline 50 of the second processing unit 20, in an efficient manner due to the direct mapped access provided through the memory mapped control interface 40.

Whilst the block of storage elements 155 configured via the mapping registers 160 provides one mechanism by which the second processing unit 20 can be given direct mapped access into a portion of the first processing unit's memory address space, it will be appreciated that other mechanisms could also be used if desired. For instance, the memory address space of the first processing unit 10 could be treated as a secondary address space of the second processing unit, separate to the primary address space of the second processing unit. The second processing unit may then be provided with a mechanism to enable it to address its secondary address space, so as to access state information within the address space of the first processing unit 10 whilst executing the interrupt service routine on behalf of the first processing unit. There are a number of mechanisms that could be used for this purpose. For example, a separate set of load and store instructions may be provided by the instruction set architecture, that are used to access the secondary address space rather than the primary address space. Alternatively, tag bits could be added into a non-address portion of an address register used by the second processing unit when generating memory addresses, to influence whether it generates memory accesses within the primary address space or the secondary address space. However, it will be appreciated that whilst such a mechanism could potentially enable the entire address space of the first processing unit to be replicated as a secondary address space of the second processing unit, it may require certain architectural changes to be implemented. Hence, in some implementations, the above-described mechanism with reference to FIG. 2 may be preferred. Although the amount of the address space within the first processing unit that can be accessed by the second processing unit at any point in time (i.e. without changing the mapping in the mapping registers 165) is dictated by the size of the block of storage elements 155, it does provide a mechanism that can be implemented without requiring any architectural changes to the system.

As also shown in FIG. 2, one or more exception event identifying registers 165 may be provided that can be programmed to identify which types of exception causing events will cause the first processing unit to enter the halted mode and issue the trigger event, rather than seeking to deal with the exception itself (for example by triggering a change in exception level and the execution of an interrupt service routine within the processing pipeline 25). This allows a great deal of configurability as to when the halted mode is used. For example, at one end of the scale, any exception causing events may cause the processing pipeline to enter the halted mode, so that all exceptions are handled remotely by the second processing unit. However, if desired, one or more different forms of exception causing event may be allowed to be processed by the first processing unit, without triggering the halted mode and the offloading of the exception handling to the second processing unit.

In one example arrangement, the exception event identifying register(s) 165 may be programmed so as to identify that whenever an exception causing event occurs within the first processing unit which would require the first processing unit to transition to a specified exception level were the exception causing event to be handled by the first processing unit, then the occurrence of that exception causing event will cause the halted mode to be entered, and the trigger event 70 to be issued to cause a physically separate processing unit such as the second processing unit 20 to handle the exception. By way of specific example, the first processing unit may be allowed to handle exception causing events that can be processed whilst staying in exception level 0, but for any exception causing events that would require a transition to exception level 1 or higher, then this may cause the processing pipeline 25 to enter the halted mode, and offload the handling of the exception to a physically separate processing unit. As another example, the first processing unit may be allowed to process exceptions that can be handled at exception level 0 or exception level 1, but will enter the halted mode for any other exception causing events that would require a transition to exception level 2 or higher.

The exception event identifying register(s) 165 can be programmed in a variety of ways, for example by trusted code executing on the second processing unit 20, by trusted code executing on the first processing unit 10, or by trusted code executed on a further processing unit used to set up the relationship between the first and second processing units.

In one implementation, the trigger event 70 may itself provide some information that will enable the second processing unit to determine the reason for the first processing unit entering the halted mode. However, in an alternative implementation, one or more syndrome registers 170 may be provided within the storage elements 45 for this purpose. In particular, the first processing unit can then write to those syndrome registers prior to entering the halted mode, so that when the second processing unit responds to the trigger event, and hence executes an interrupt service routine, it can then access the syndrome registers in order to obtain that information.

Figure 3:
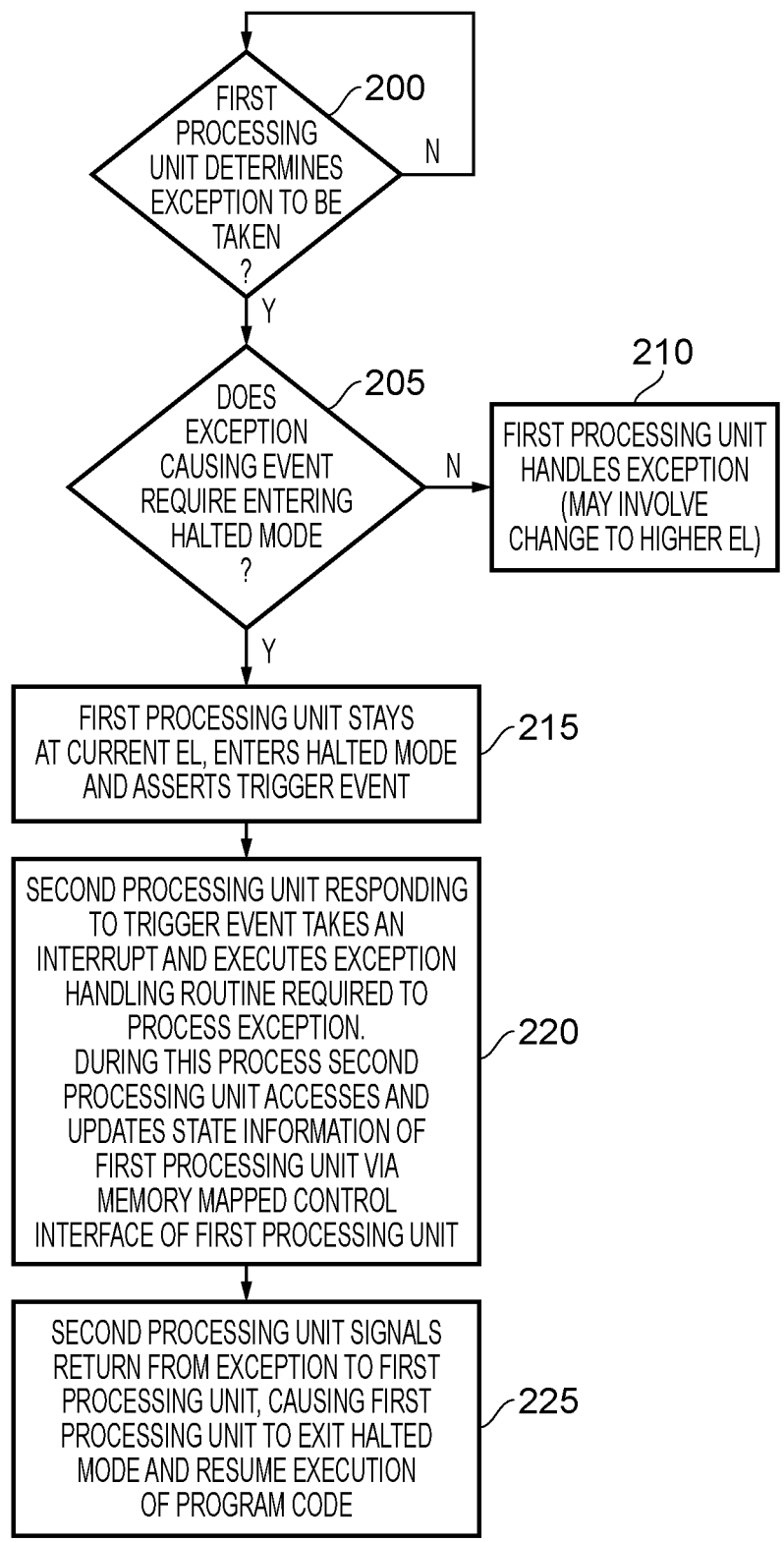
FIG. 3 is a flow diagram illustrating the handling of exceptions in accordance with one example implementation.

FIG. 3 is a flow diagram illustrating the operation of the system of FIG. 1 when handling an exception causing event detected within the first processing unit 10. At step 200, it is determined whether the first processing unit has detected that an exception needs to be taken. When this is detected, then at step 205 it is determined whether the exception causing event requires the first processing unit to enter the halted mode. As discussed earlier, this may depend on the configuration of the exception event identifying register(s) 165. If the exception causing event does not require the first processing unit to enter the halted mode, then the process proceeds to step 210 where the first processing unit handles the exception in the standard manner. As discussed earlier this may involve the first processing unit changing to a higher exception level.

If it is determined that the exception causing event requires the first processing unit to enter the halted mode, then at step 215 the first processing unit stays at its current exception level, enters the halted mode, and asserts the trigger event.

The trigger event may be targeted at a particular processing unit that is to handle the exception, or instead may be routed via an interrupt redistributor mechanism, which determines which processing unit to direct the trigger event to. Whichever mechanism is used, the trigger event ultimately is received by a suitable second processing unit, and at step 220 the second processing unit responding to the trigger event takes an interrupt in order to halt the processing currently being performed by that second processing unit, and then executes a suitable exception handling routine in order to process the exception. The determination of the exception handling routine can be made in a standard way, for example by reference to the type of exception that has been raised. Further, information such as the interrupt number issued as part of the trigger event will enable the second processing unit to determine the first processing unit that has issued the trigger event, and hence determine which memory mapped control interface 40 it is to communicate with when performing the exception handling routine.

As indicated at step 220, during the process of executing the exception handling routine, the second processing unit 20 will access and update state information of the first processing unit 10 via the storage elements 45 of the memory mapped control interface 40 of the first processing unit 10. This may involve for example accessing and updating contents of one or more registers within the register set 30, and accessing and updating one or more memory locations within the memory address space of the first processing unit.

The second processing unit will thereafter, at step 225, signal a return from the exception over path 90 to the first processing unit, causing the first processing unit to exit the halted mode and resume execution of the program code.

FIGS. 4A and 4B illustrate the enhanced protection given to data when adopting the above described approach. In particular, FIG. 4A illustrates the approach that would be adopted without the present technique, i.e. where the first processing unit handles its own exceptions, for example by transitioning to a higher exception level and then executing the required exception handling routine at that higher exception level. Initially, it is assumed that application code is running on the first processing unit (referred to as CPU 0 in FIG. 4A) at an application exception level, and then at point 250 a trap is taken to an exception handling routine. In this example, it is assumed that when point 250 is reached, the processing unit transitions to a higher exception level, for example an exception level associated with operating system software, and then the exception handling routine is executed under operating system control.

Both the application code that was executing prior to the trap point 250, and the operating system code used to implement the exception handling routine, access a local cache 230 within CPU 0. During the performance of the exception handling routine, then different types of data may be read from, and written to, the cache 230 by the operating system software. This may include the operating system's own data 255, 265, which can be considered to be data that is private to the operating system, and is not to be shared with the application code, but may also include user data 260, for example updated state information for the application exception level, this data being data of the type that is to be made available to the application code once the exception handling routine is completed, and the processing pipeline has returned to the application exception level in order to resume execution of the application code.

At step 270, it is assumed that the exception handling routine completes, and hence the processor returns from the exception, causing a transition back to the application exception level (for example exception level (EL) 0), whereafter CPU 0 resumes processing of the application code, and accesses the cache 230. Whilst various mechanisms can be employed to seek to protect the operating system's own data 255, 265 from being accessed by application code after the return from the exception handling routine, for example by flushing that data from the cache, or by protecting it using some other mechanism, there has recently been increased concerns over the security of such data, and the prospects of side channel attacks being used to access that data.

FIG. 4B illustrates how, when using the techniques described herein, the security of such data can be improved. In particular, again it is assumed that CPU 0 is executing application code at an application exception level, for example EL0, and then at point 275 an exception causing event occurs, causing a trap to an exception handling routine. In accordance with the techniques described earlier, at this point CPU 0 enters the halted mode, and ceases execution of instructions. The issuing of the trigger event causes an interrupt to be taken by the second processing unit, referred to in FIG. 4B as CPU 1. At point 280, CPU 1 then starts to execute the required exception handling routine, and again this may involve execution of code at an operating system exception level, for example EL1. However, as the required exception routine is being run by CPU 1, then the private data of the operating system (the "own data") 282, 286 can be read from, and written to CPU 1's local cache 240. Conversely, the user data 284 that is to be shared with the application code is written through the control interface 235 of CPU 0 into the local cache 230 of CPU 0, using the mechanism discussed earlier, i.e. the direct mapped access to the memory address space of CPU 0 provided via the storage elements within the memory mapped control interface 235.

When in due course the exception handling routine is completed, and accordingly the process returns from the exception at step 290, then this will cause CPU 0 to resume execution of the application code. However, due to the physical separation between CPU 0 and CPU 1, there is significantly enhanced security, since none of the operating system sensitive data has been written into the cache 230 of CPU 0.

Furthermore, security is generally enhanced, since when employing the mechanism of FIG. 4B, CPU 0 never transitions from the application exception level (e.g. exception level 0), and accordingly has no access privileges associated with a higher exception level (contrary to the situation that would be the case had CPU 0 itself transitioned to a higher exception level in order to handle the exception).

Some performance benefits may also be realised when adopting the techniques described with reference to FIG. 4B. For example, since during the handling of the exception, no data is stored in the cache 230 of CPU 0 that is not relevant to exception level 0, then no steps are needed to maintain the security of exception level 1 data when the exception handling routine has been completed. For example, there is no need to flush any data out of the cache 230 of CPU 0 when the exception handling routine completes at point 290.

It should be noted that the techniques described herein can be extended so as to allow the second processing unit to take more of a control role in the operation of the first processing unit. For example, the second processing unit 20 may be considered to take the form of a control core that can halt the first processing unit (which could for example be considered to be an application core) and switch context at any time, for example to timeshare the application core between multiple user processes. Hence, in addition to the control core providing a system service to the application core, by handling exceptions for one or more types of exception causing event, such an approach enables the application core to also effectively provide a compute service to the control core. A single control core could manage multiple application cores in such a scenario.

Figure 5A:
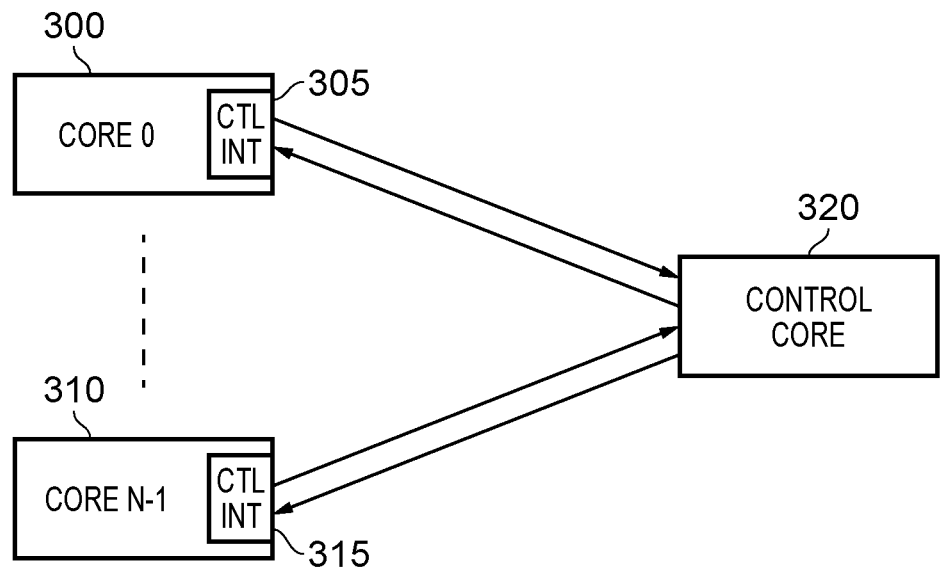
FIGS. 5A and 5B illustrate example implementations of processing units in which the techniques described herein may be utilised.

The processing units in which the above described techniques can be employed can take a variety of forms. For example, as shown in FIG. 5A, each of the processing units may be separate processor cores. Hence, multiple first processing units 300, 310 can be provided, each having an associated control interface 305, 315 that is memory mapped into the memory address space of a second processing unit, referred to in FIG. 5A as the control core 320.

When an exception causing event occurs in any of the cores 300, 310 and is of a type that causes that core to enter the halted mode and issue a trigger event, the trigger event can be routed to the control core 320. Based on the exception number, the control core can determine which core issued the trigger event, and can then execute a suitable exception handling routine, taking into account the type of exception that has arisen, in order to process the exception. Using the techniques described earlier, the control core can access and update the required state of the core 300, 310 that issued the trigger event, via the associated control interface 305, 315.

Figure 5B:
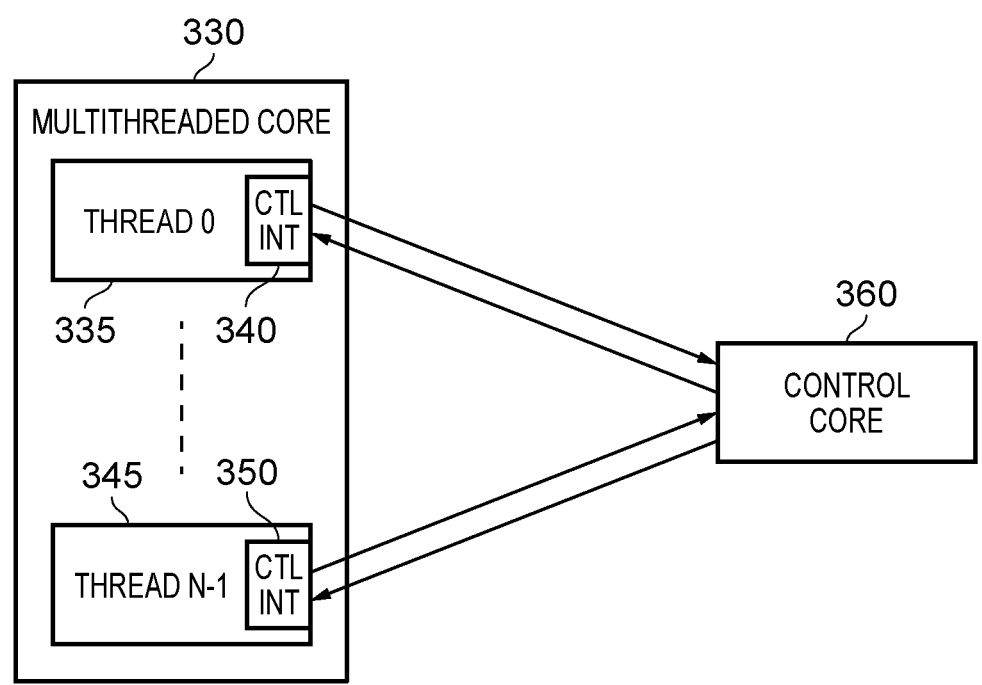

However, it is not necessary for the processing units to be separate processor cores as shown in FIG. 5A. Instead, the separate processing units may be separate threads within a multi-threaded core, such as shown in FIG. 5B. Hence, the multi-threaded core 330 may comprise multiple threads 335, 345 which each may have an associated control interface 340, 350. Whilst the different threads may share some processing resources of the multi-threaded core 330, the threads effectively form separate processing elements, and may have their own registers, address space, operate in their own particular exception levels, etc. Hence, the individual threads can operate in the same way as the first processing unit discussed earlier, and may issue trigger events to the second processing unit to cause the second processing unit to handle exceptions on their behalf. Hence, the control core 360 can handle exceptions in exactly the same way as discussed earlier with reference to the example of FIG. 5A, with the exception number information being used to identify the particular thread within the multi-threaded core that has issued the trigger event.

Whilst in FIG. 5B the control core 360 is shown as a separate processor core, it should be noted that in other implementations the control core 360 may itself be one of the threads within the multi-threaded core 330.

Figure 6:
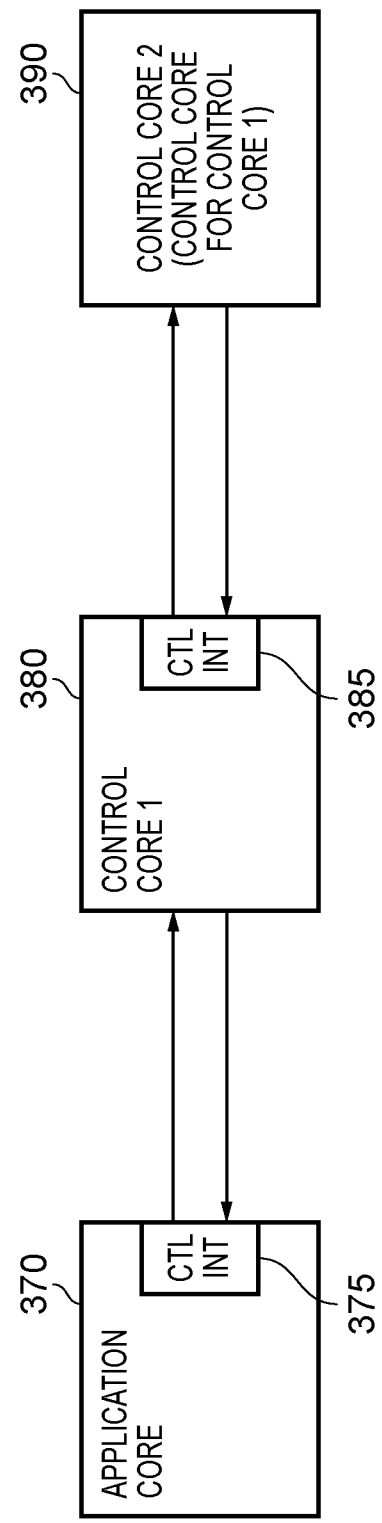
FIG. 6 illustrates how the technique described herein can be implemented to allow nesting of exception handling, in accordance with one example arrangement.

FIG. 6 illustrates how the technique described herein can be used to support nested handling of exceptions. Hence, in this example the first processing unit takes the form of the application core 370 having an associated control interface 375 that is mapped into the memory address space of the second processing unit, in this example control core 1 380. However, it is also possible that during the processing performed by the control core 1 380, exception causing events will be detected within the control core 1, requiring an exception to be taken, and a suitable exception handling routine to be performed. Whilst in such instances the exception handling routine could be implemented within the control core 1 380 itself, for example by transitioning to a higher exception level and executing a suitable exception handling routine, in an alternative embodiment control core 1 380 may also have a control interface 385 that is memory mapped into the memory address space of control core 2 390. By such an approach, the control core 1 can, for certain exception causing events, enter the halted mode, and issue a trigger event to cause control core 2 390 to execute a suitable exception handling routine, and during that process control core 2 390 may access and update the required state within the control core 1 380 via the control interface 385.

It will be appreciated that the scheme illustrated in FIG. 6 can be extended arbitrarily to provide more nested levels if desired. Such a mechanism provides significant flexibility. For example, it will be appreciated that in one instance each individual core may be arranged to only operate at a single exception level, with all exception causing events being routed to a separate core for handling. In some instances, this may mean that the concept of exception levels could be dispensed with altogether.

As with the earlier discussed FIG. 5B, whilst in FIG. 6 it is assumed that the elements 370, 380, 390 are separate processor cores, in an alternative implementation those elements could be provided by separate threads within a multi-threaded core.

Figure 7:
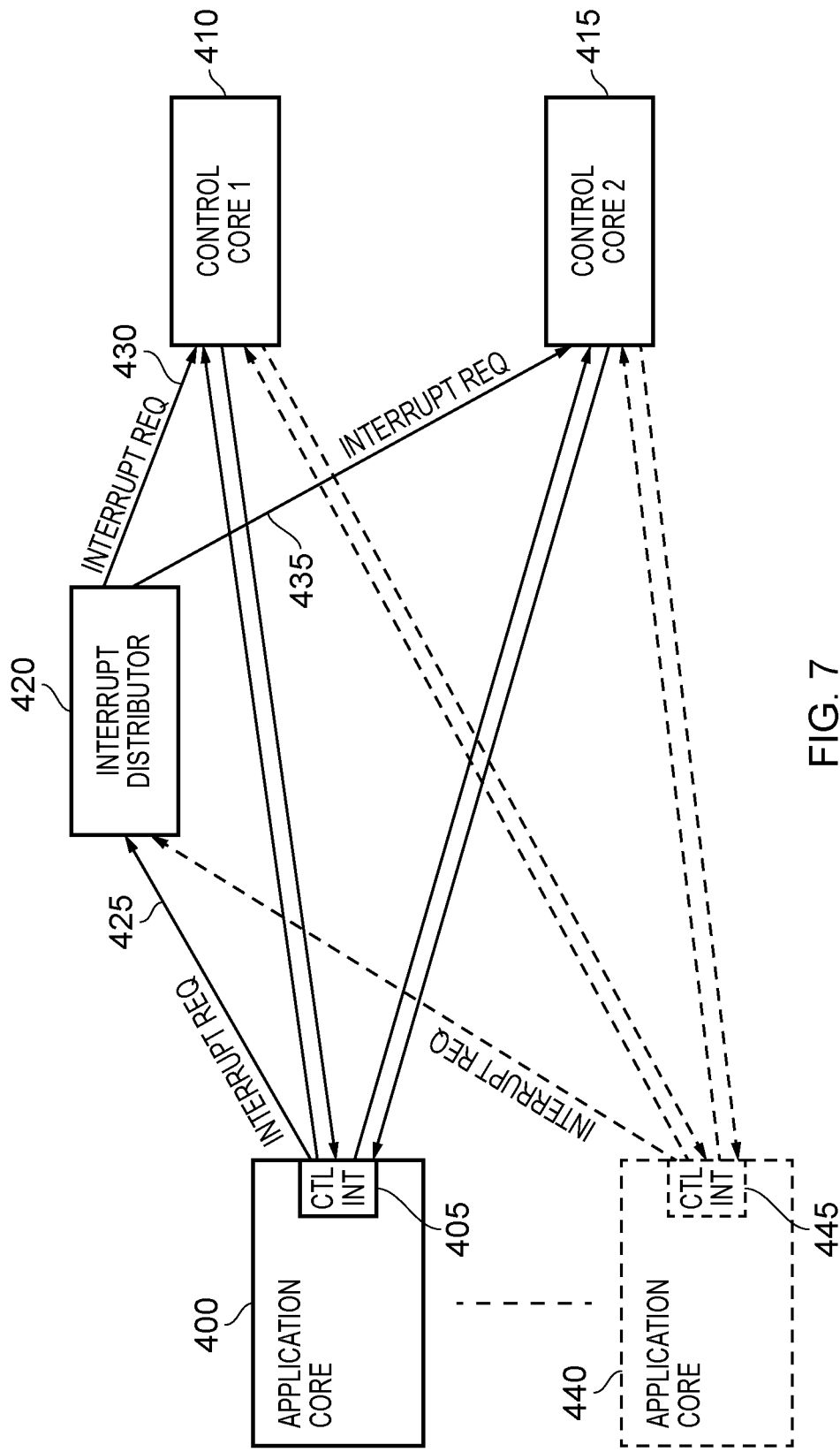
FIG. 7 illustrates an alternative example configuration where an interrupt distributor is used to distribute interrupts to one of a number of different control cores.

FIG. 7 illustrates an implementation where an interrupt distributor 420 is provided within the system. In this example, there are multiple control cores 410, 415, each of which can be provided with memory mapped access to one or more application cores 400, 440. The application cores have associated control interfaces, 405, 445 arranged as discussed earlier to provide for direct mapped access to certain state information within those application cores by a control core executing an interrupt service routine on behalf of the application core.

In such an implementation, when an application core 400 issues a trigger event, this can take the form of an interrupt request passed to the interrupt distributor 420. Hence, when the application core 400 asserts a trigger event, it can issue an interrupt request over path 425 to the interrupt distributor 420. The interrupt distributor will then employ a mechanism to determine which control core to route the interrupt request to, and will send the interrupt request either over path 430 to the control core 1 410 or over path 435 to the control core 2 415. It will be appreciated that in FIG. 7 only two control cores have been shown for simplicity, but in other implementations more control cores may be provided, and accordingly there may be more options for the interrupt distributor 420 as regards the destination control core to which the interrupt request is propagated.

Assuming the interrupt request is accepted by the control core it is directed to, then the processing proceeds essentially as discussed earlier, with that control core performing a suitable exception handling routine, during which process load and/or store operations can be performed to the storage elements within the memory mapped control interface 405 in order to access and update state information within the application core 400. Once the exception handling routine has been completed, the application core 400 is notified of the return from the exception, and then exits the halted mode in order to resume execution of the application code.

Whilst in FIG. 7 reference has been made to application cores and control cores, it will be appreciated from the earlier-discussed FIG. 6 that the core issuing the interrupt request need not be an application core, and could itself be executing software at a higher exception level than application code.

It will also be appreciated from the earlier discussion that the various cores illustrated in FIG. 7 need not be physically separate processor cores, but could instead be separate threads executing on a multi-threaded core.

Figure 8:
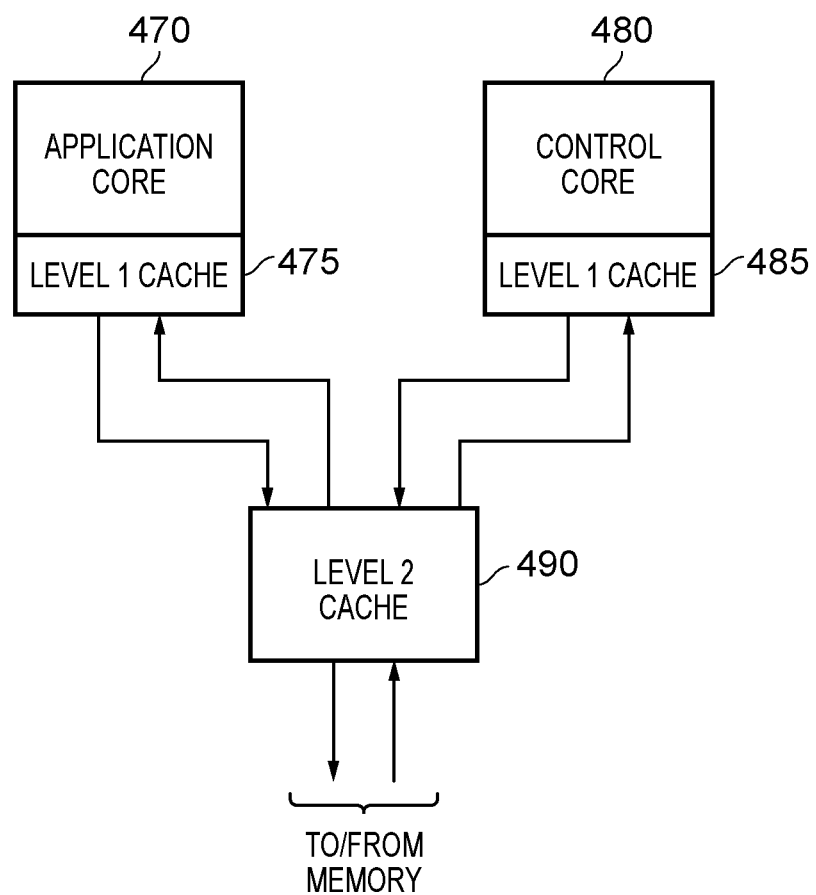
FIG. 8 illustrates an example arrangement where at least one level of cache may be shared between an application core and a control core.

Whilst in one implementation, the cache structures accessed by the application core and the control core may be separate, in some instances one or more of the levels of cache may be shared, as illustrated by way of example in FIG. 8. In this example, the application core 470 has a local level 1 cache 475, and the control core 480 also has an associated level 1 cache 485. However, if desired, the application core 470 and the control core 480 may share a level 2 cache 490. Whilst in some implementations, in order to provide enhanced robustness against cache timing side-channel attacks, such as the earlier-mentioned Spectre based attacks, it may be considered inappropriate to share a level 2 cache structure, and in such instances the application core and the control core may have distinct level 2 cache structures as well as distinct level 1 cache structures, in other implementations the approach illustrated in FIG. 8 may be entirely acceptable. In particular, it would still be possible with such an approach to obtain many of the benefits of allowing exceptions to be handled by separate cores using the above discussed halted mode, for example the physical separation of exception levels, and the possibility of arranging for certain cores to only support a subset of the possible exception levels, in some instances being able to only operate at a single exception level. By allowing the sharing of at least some cache structures, this increases the areas of applicability of the presently described technique, for example making it more readily applied in relation to individual threads within a multi-threaded core.

When adopting the techniques described herein, a number of benefits can be realised, whilst improving the overall security through the physical separation of exception levels. Firstly, it is noted that the application software running on the application core does not need to change. Further, the control core need not be running at a higher exception level, and could even be running at exception level 0, provided it is given memory-mapped access to the application core in the manner discussed earlier. As also discussed earlier, a control core's exceptions could themselves be trapped and handled by another core, allowing arbitrary nesting of exception handling.

Further, assuming an application core can rely on its exceptions being delegated to a control core, that application core might only implement a subset of exception levels, e.g. EL0 only (hence implementing a pure data-plane core), which can lead to significant simplification in the design.

In one particular implementation, all application and control cores could be arranged so that they only need to implement a single exception level, which could potentially allow for dispensing with exception levels entirely.

As mentioned earlier, in one example implementation, the memory mapped control interface 40 provided within the first processing unit 10 can be formed by enhancing the capabilities of an existing debug interface, to allow for fast memory-mapped access by a control core, and to provide direct mapped access to the relevant register state and/or memory address space. It should be noted that the improved memory mapped interface would also support existing debug use cases with improved efficiency, allowing an external debugger faster access to the core's registers and its view of memory, and hence can provide additional benefits beyond those associated with exception handling.

As mentioned earlier, whilst in one implementation physically separate processor cores can be used, in alternative implementations the individual processing units can take the form of individual threads within a multi-threaded core. Hence, exception causing events occurring within a first thread can give rise to that thread entering the halted mode, and the exception being offloaded to another thread for handling, with that other thread having memory mapped access to the state of the first thread. The above described nested approach could be adopted in one such example implementation, with each thread corresponding to a particular exception level, thus enabling exceptions that need to be handled at a particular exception level to be directed to a particular thread that can operate at that exception level.

As mentioned earlier, in some implementations the storage elements within the memory mapped control interface 40 can be configured to allow a great degree of configurability as to the type of exception causing events that will result in the first processing unit entering the halted mode, and issuing a trigger event to cause the excepting handling routine to be performed by a different processing unit. In some instances, the first processing unit may be arranged so that it always responds to exceptions in that manner irrespective of the exception causing event. In that instance, with reference to the earlier discussed FIG. 3, it will be seen that step 205 is effectively removed, and hence there will never be a path going to step 210 where the first processing unit handles the exception. Instead, the process will proceed directly to step 215 where the processing unit will stay at its current exception level, enter the halted mode and assert the trigger event. This can lead to significant simplifications in the complexity of the first processing unit.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A system comprising:
a first processing unit to execute program code; and
a second processing unit;
the first processing unit having a control interface mapped to memory address space of the second processing unit and configured to provide the second processing unit with direct mapped access to state information of the first processing unit;
the first processing unit being responsive to at least one exception causing event, determined to require the first processing unit transitioning to a specified exception level were the at least one exception causing event to be handled by the first processing unit, to enter a halted mode where the first processing unit stops execution of the program code and issues a trigger event;
the second processing unit being responsive to the trigger event to execute an exception handling routine during which the second processing unit is arranged to access the state information of the first processing unit via the control interface in order to modify the state information as required by the exception handling routine;
the second processing unit being arranged on completion of the exception handling routine to cause the first processing unit to exit the halted mode and resume execution of the program code;
the first processing unit being arranged to remain at its current exception level when entering the halted mode, and the second processing unit is arranged to execute the exception handling routine at a chosen exception level.

2. A system as claimed in claim 1, wherein the state information of the first processing unit comprises content of a set of registers of the first processing unit used to store data processed by the first processing unit when executing the program code.

3. A system as claimed in claim 2, wherein the control interface provides a set of storage elements mapped to the memory address space of the second processing unit to provide direct mapped access to the set of registers by the second processing unit.

4. A system as claimed in claim 1, wherein the state information of the first processing unit comprises data stored in at least a portion of memory address space of the first processing unit.

5. A system as claimed in claim 4, wherein said at least a portion of the memory address space of the first processing unit forms a secondary address space of the second processing unit.

6. A system as claimed in claim 4, wherein the control interface provides a block of storage elements mapped to the memory address space of the second processing unit, each storage element in the block being directly mapped to a corresponding memory location within said at least a portion of the memory address space of the first processing unit.

7. A system as claimed in claim 6, wherein the control interface comprises configurable mapping storage to identify the direct mapping between the storage elements in the block of storage elements and the corresponding memory locations within said at least a portion of the memory address space of the first processing unit.

8. A system as claimed in claim 1, wherein the control interface comprises configurable exception event identifying storage to identify which exception causing events, when encountered during execution of the program code by the first processing unit, are to cause the first processing unit to enter the halted mode and issue the trigger event.

9. A system as claimed in claim 8, wherein the configurable exception event identifying storage is configured to identify that the first processing unit is to enter the halted mode and issue the trigger event whenever an exception causing event occurs that is determined to require the first processing unit transitioning to the specified exception level were the exception causing event to be handled by the first processing unit.

10. A system as claimed in claim 1, wherein the chosen exception level is an exception level higher than the current exception level of the first processing unit.

11. A system as claimed in claim 1, wherein the control interface comprises syndrome storage mapped to the memory address space of the second processing unit and written to by the first processing unit to provide information used by the second processing unit to assist in identifying why the first processing unit entered the halted mode.

12. A system as claimed in claim 1, further comprising:
a third processing unit having a further control interface mapped to memory address space of the second processing unit and configured to provide the second processing unit with direct mapped access to state information of the third processing unit;
the third processing unit being responsive to at least one exception causing event in the same way as the first processing unit, and hence to enter the halted mode where the third processing unit stops execution and issues the trigger event;
the trigger event comprising information enabling the second processing unit to determine whether the trigger event was issued by the first processing unit or the third processing unit, and thus determine which of the first and third processing units to access when executing the exception handling routine.

13. A system as claimed in claim 1, further comprising:
an additional processing unit;
the second processing unit having a second control interface mapped to memory address space of the additional processing unit and configured to provide the additional processing unit with direct mapped access to state information of the second processing unit;
the second processing unit being responsive to at least one exception causing event to enter a second processing unit halted mode where the second processing unit stops execution of program code being run on the second processing unit, and issues a further trigger event;
the additional processing unit being responsive to the further trigger event to execute a further exception handling routine during which the additional processing unit is arranged to access the state information of the second processing unit via the second control interface in order to modify that state information as required by the further exception handling routine;
the additional processing unit being arranged on completion of the further exception handling routine to cause the second processing unit to exit the second processing unit halted mode and resume execution of the program code being run on the second processing unit.

14. A system as claimed in claim 1, wherein the first processing unit is an application processing unit and the program code is application program code, and the second processing unit is a control processing unit.

15. A system as claimed in claim 1, wherein the first processing unit and the second processing unit are provided by separate processor cores.

16. A system as claimed in claim 1, wherein the first processing unit and the second processing unit have separate cache structures for at least a subset of cache levels within the system.

17. A system as claimed in claim 1, wherein the first processing unit and the second processing unit are provided by separate threads on a multi-threaded processor core.

18. A system as claimed in claim 1, wherein at least one of the first processing unit and the second processing unit is constrained to only operate at a single exception level.

19. A system as claimed in claim 1, wherein the second processing unit is one of:
a targeted processing unit to which the trigger event is issued; and
a processing unit amongst several processing units that are capable of responding to the trigger event.

20. A first processing unit comprising:
execution circuitry to execute program code; and
a control interface mapped to memory address space of a second processing unit and configured to provide the second processing unit with direct mapped access to state information of the first processing unit;
the execution circuitry being responsive to at least one exception causing event, determined to require the first processing unit transitioning to a specified exception level were the at least one exception causing event to be handled by the first processing unit, to enter a halted mode where the execution circuitry stops execution of the program code and issues a trigger event;
the control interface being arranged to be accessible to the second processing unit whilst the second processing unit is executing an exception handling routine in response to the trigger event, to enable the second processing unit to access and modify the state information of the first processing unit as required by the exception handling routine;
the execution circuitry being arranged, when the second processing unit has completed the exception handling routine, to exit the halted mode and resume execution of the program code;
the first processing unit being arranged to remain at its current exception level when entering the halted mode.

21. A second processing unit comprising:
execution circuitry to execute an exception handling routine in response to a trigger event issued by a first processing unit on encountering at least one exception causing event determined to require the first processing unit transitioning to a specified exception level were the at least one exception causing event to be handled by the first processing unit, the trigger event indicating that the first processing unit has entered a halted mode where execution of program code by the first processing unit has been halted with the first processing unit remaining at its current exception level; and a communication interface via which the execution circuitry is arranged to access a control interface of the first processing unit whilst executing the exception handling routine at a chosen exception level, the control interface being mapped to memory address space of the second processing unit and configured to provide the second processing unit with direct mapped access to state information of the first processing unit;

the execution circuitry being arranged to access the state information of the first processing unit via the control interface in order to modify the state information as required by the exception handling routine; and the execution circuitry being arranged on completion of the exception handling routine to cause the first processing unit to exit the halted mode and resume execution of the program code.

22. A method of handling at least one exception causing event in a system having a first processing unit to execute program code, and a second processing unit, comprising:

providing the first processing unit with a control interface mapped to memory address space of the second processing unit and configured to provide the second processing unit with direct mapped access to state information of the first processing unit;

responsive to at least one exception causing event within the first processing unit determined to require the first processing unit transitioning to a specified exception level were the at least one exception causing event to be handled by the first processing unit, causing the first processing unit to enter a halted mode where the first processing unit stops execution of the program code, and issues a trigger event;

causing the second processing unit to be responsive to the trigger event to execute an exception handling routine during which the second processing unit accesses the state information of the first processing unit via the control interface in order to modify the state information as required by the exception handling routine; and on completion of the exception handling routine by the second processing unit, causing the first processing unit to exit the halted mode and resume execution of the program code, wherein the first processing unit remains at its current exception level when entering the halted mode, and the second processing unit executes the exception handling routine at a chosen exception level.

* * * * *